United States Patent
MacDougall et al.

(10) Patent No.: US 8,737,774 B2
(45) Date of Patent: May 27, 2014

(54) ARRAY TEMPERATURE SENSING METHOD AND SYSTEM

(75) Inventors: Trevor MacDougall, Simsbury, CT (US); John J. Grunbeck, Northford, CT (US); James R. Dunphy, South Glastonbury, CT (US); Domino Taverner, Delray Beach, FL (US); Guy A. Daigle, Bristol, CT (US); Richard T. Jones, Hamden, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 893 days.

(21) Appl. No.: 11/468,646

(22) Filed: Aug. 30, 2006

(65) Prior Publication Data

US 2008/0056639 A1  Mar. 6, 2008

(51) Int. Cl.
*G02B 6/00* (2006.01)

(52) U.S. Cl.
USPC .......................................................... 385/12

(58) Field of Classification Search
USPC .......................................................... 385/12
See application file for complete search history.

(56) References Cited

U.S. PATENT DOCUMENTS

| | | | |
|---|---|---|---|
| 6,278,823 B1 | 8/2001 | Goldner et al. | |
| 6,304,666 B1 | 10/2001 | Yamate et al. | |
| 6,304,686 B1 | 10/2001 | Yamate et al. | |
| 6,807,324 B2 | 10/2004 | Pruett | |
| 6,931,188 B2 | 8/2005 | Kersey et al. | |
| 6,931,194 B2 | 8/2005 | Dowd et al. | |
| 6,955,085 B2 | 10/2005 | Jones et al. | |
| 2002/0154860 A1 | 10/2002 | Fernald et al. | |
| 2003/0223822 A1 | 12/2003 | Oldervoll et al. | |
| 2004/0165841 A1 | 8/2004 | Fernald et al. | |
| 2005/0039544 A1 | 2/2005 | Jones | |
| 2005/0078316 A1 | 4/2005 | Ronnekleiv et al. | |
| 2005/0172721 A1* | 8/2005 | Daigle | 73/705 |

FOREIGN PATENT DOCUMENTS

| | | |
|---|---|---|
| GB | 2 398 120 | 8/2004 |
| WO | WO 98/31987 | 7/1998 |
| WO | WO 99/23355 | 5/1999 |
| WO | WO 00/33034 | 6/2000 |
| WO | WO 2005/033465 | 4/2005 |

OTHER PUBLICATIONS

GB Search Report, Application No. GB0715045.1, dated Dec. 6, 2007.
Canadian Office Action, Application No. 2,597,236, dated Jun. 26, 2009.

* cited by examiner

*Primary Examiner* — Ryan Lepisto
*Assistant Examiner* — Erin Chiem
(74) *Attorney, Agent, or Firm* — Patterson & Sheridan, LLP (57) ABSTRACT

Methods and apparatus enable monitoring conditions in a well-bore using multiple cane-based sensors. The apparatus includes an array of cane-based Bragg grating sensors located in a single conduit for use in the well-bore. For some embodiments, each sensor is located at a different linear location along the conduit allowing for increased monitoring locations along the conduit.

17 Claims, 10 Drawing Sheets

ARRAY TEMPERATURE SENSING METHOD AND SYSTEM

BACKGROUND OF THE INVENTION

1. Field of the Invention

Embodiments of the invention generally relate to apparatus and methods of measuring conditions in a well-bore.

2. Description of the Related Art

Distributed Temperature Sensing (DTS) enables monitoring temperature along the length of a well. A DTS system utilizes an optical waveguide, such as an optical fiber, as a temperature sensor. In a typical DTS system, a laser or other light source at the surface of the well transmits a pulse of light into a fiber optic cable installed along the length of the well. Due to interactions with molecular vibrations within glass of the fiber, a portion of the light is scattered back towards the surface. A processor at the surface analyzes the light as it is sent back. The processor then determines the temperature at various depths within the well, based on the reflected light.

A problem with DTS systems is that the signal reflected back to the processor is weak and can be difficult to read. This problem is especially true for long waveguides in deep wells. Therefore, the weak signal makes it difficult to accurately determine the temperature in deep well-bores.

Utilizing an Array Temperature Sensing system (ATS) overcomes the weak signal of the DTS system. In the ATS system, several Bragg gratings are placed in a waveguide, such as a fiber. The gratings can be at any desired location along the waveguide. Advantageously, a reflected signal from the grating is greater than that of the DTS system.

A major challenge to the use of an ATS system involves the packaging of the Bragg gratings such that they are responsive to the temperature of their surroundings but are free from, or insensitive to, strain changes over their lifetime. The effects of these strain changes are generally indistinguishable from those of changes in temperature and cause errors in the temperature measurement.

DTS measurement is also sensitive to changes in the loss and refractive index of the optical fiber being interrogated, while the gratings of the ATS system are sensitive to changes in the refractive index and physical dimension of the fiber. In many cases, such changes happen over the lifetime of the system. For example, production fluids and gases, particularly hydrogen, in a well-bore can cause significant increases in the fiber loss and refractive index of glass optical fibers. The ingress of production fluids, e.g., water, can cause swelling of the glass optical fibers which changes the measured wavelength and hence measured temperature of the Bragg gratings in the ATS system.

Therefore, there exists a need for an improved ATS system that reflects a stronger signal than a DTS system and eliminates or at least reduces adverse effects of changes in strain over the system lifetime. A further need exists for methods and assemblies to provide the ATS system that is protected from the ingress of fluids and gases.

SUMMARY OF THE INVENTION

Embodiments of the invention generally relate to methods and apparatus that enable monitoring conditions in a well-bore using multiple cane-based sensors. The apparatus includes an array of cane-based Bragg grating sensors located in a single conduit for use in the well-bore. For some embodiments, each sensor is located at a different linear location along the conduit allowing for increased monitoring locations along the conduit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to methods and assemblies for monitoring one or more parameters at multiple discrete locations in a well-bore. For example, temperature can be measured using multiple sensor arrays on multiple waveguides enclosed in a single conduit. According to some embodiments, a large diameter optical waveguide section having a reflective grating disposed therein defines an individual sensing element or sensor, which is spaced from other sensors within an array of sensors by interconnecting lengths of waveguide, such as optical fiber, that have relatively smaller outer diameters than the sensors.

As used herein, the term "large diameter optical waveguide" ("cane") refers to any optical waveguide having at least one core surrounded by a cladding that has an outer diameter of 0.3 millimeters (mm) or larger, for example, about 4.0 mm or more. The large diameter optical waveguide preferably includes silica glass ($SiO_2$) based material having appropriate dopants to allow light to propagate in either direction through the core. Other materials for the large diameter optical waveguide may be used, such as phosphate, aluminosilicate, borosilicate, fluoride glasses or other glasses, or plastic.

Furthermore, the large diameter optical waveguide is thicker and sturdier because of a substantial amount of cladding than standard fiber that has an outer diameter of, for example, 125 microns. In other words, a clad-to-core diameter ratio of the large diameter optical waveguide is large (e.g., ranging from about 30 to 1 to 300 to 1) when compared to a standard optical fiber clad-to-core ratio of approximately 12 to 1. Therefore, a length-to-diameter aspect ratio of the large diameter optical waveguide causes the large diameter optical waveguide to resist buckling in the event the sensor is placed in axial compression. This rigidity of the large diameter optical waveguide substantially averts susceptibility of the large diameter optical waveguide to breakage and losses caused by bending. Additionally, the core of the large diameter optical waveguide can have an outer diameter of about 7 to 12 microns such that it propagates only a single spatial mode at or above the cutoff wavelength and a few (e.g., six or less) spatial modes below the cutoff wavelength. For example, the core for single spatial mode propagation can have a substantially circular transverse cross-sectional shape with a diameter less than about 12.5 microns, depending on a wavelength of light.

Figure 1:
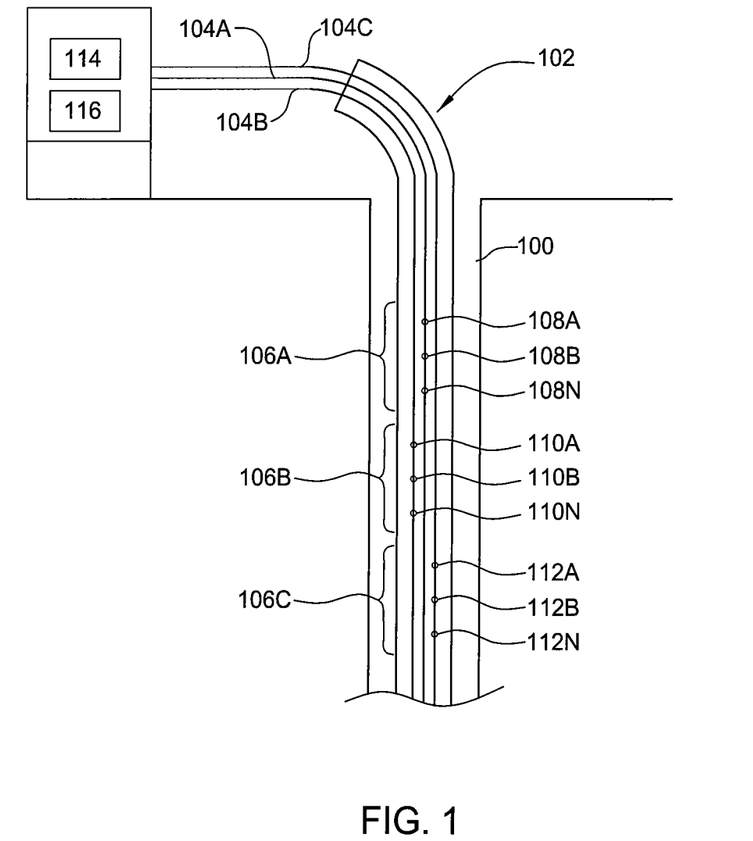
FIG. 1 is a partial sectional view of a well-bore having a conduit with multiple Array Temperature Sensing sections, according to embodiments of the invention.

FIG. 1 illustrates a cross-sectional view of a well-bore 100 having a conduit 102 equipped for sensing downhole conditions. As shown, the conduit 102 includes a first waveguide 104A, a second waveguide 104B and a third waveguide 104C that are all suitable for transmitting optical signals. The conduit 102 can be any tubular member for containing the waveguides 104A-C and can include components (not shown) such as armoring, a metal tube, a buffer, etc. While illustrated as having three waveguides, any number of waveguides can be utilized within the conduit 102. Each of the waveguides 104A-C includes a respective first array 106A, second array 106B and third array 106C located along a length thereof.

Each of the arrays 106A-C includes sensors 108A-N, 110A-N, 112A-N, respectively. The number of sensors on each of the waveguides 104A-C can depend on the frequency of light reflected back at each of the sensors 108A-N, 110A-N, 112A-N. The sensors 108A-N, 110A-N, 112A-N can be spaced at any desired interval in the arrays 106A-C, which can be located at any depth. For example, the sensors 108A-N, 110A-N, 112A-N can be spaced between about 0.5 meters to approximately 1.0 kilometers apart within each of the arrays 106A-C. In some embodiments, the arrays 106A-C are in series, one after another, thus the first array 106A is followed by the second array 106B so that a long length of the well-bore is monitored by the conduit 102. The conduit 102 with the arrays 106A-C along with the sensors 108A-N, 110A-N, 112A-N can incorporate any of the various features and aspects described in further detail hereinafter relating to corresponding elements and assembly techniques.

Figure 2:
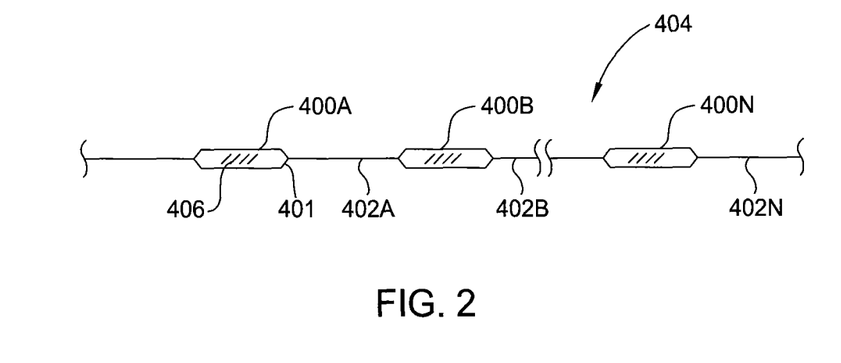
FIG. 2 is a view of an array of temperature sensors provided at enlarged outer diameter portions of a waveguide relative to interconnecting fiber portions of the waveguide between the enlarged outer diameter portions.

FIG. 2 shows an array 404 of temperature sensors including a first temperature sensor 400A, a second temperature sensor 400B and a third temperature sensor 400N. The sensors 400A-N enable a plurality of discrete point temperature measurements at each location of the sensors 400A-N. Enlarged outer diameter portions along a waveguide define large diameter optical waveguide sections where the sensors 400A-N are provided. Interconnecting fiber portions 402A-N of the waveguide optically connect between ends of the sensors 400A-N such that the sensors 400A-N are spaced from one another along a length of the array 404. With this arrangement, the interconnecting fiber portions 402A-N along with the sensors 400A-N establish the waveguide, which is continuous across the length of the array 404. Further, the sensors 400A-N have a relatively larger outer diameter compared to an outer diameter of the interconnecting fiber portions 402A-N. As previously described, the large diameter optical waveguide sections where the sensors 400A-N are located provide limited sensitivity to strain effects due to increased cross-sectional area.

With reference to the first sensor 400A, each of the sensors 400A-N includes a reflective grating 406, such as a Bragg grating, disposed therein to permit measuring temperature based on interrogation of light signals reflected from the grating 406. Additionally, the interconnecting fiber portion 402A splices to a mating end 401 of the first sensor 400A where the large diameter optical waveguide section is machined to an outer diameter substantially matching an outer diameter of the interconnecting fiber portion 402A. Machining the mating end 401 of the first sensor 400A enables fusion splicing between the large diameter optical waveguide section and the interconnecting fiber portion 402A. Such fusion splicing can be automated with a fast splicing apparatus commonly used in the art for splicing optical fibers. It is also possible to check the yield strength of the splice with commonly used optical fiber test apparatus. See, U.S. Publication No. 2004/0165841, entitled "Large Diameter Optical Waveguide Splice," which is herein incorporated by reference in its entirety. An excess length of the interconnecting fiber portion 402A (i.e., overstuff when the array 404 is within a cable or conduit) prevents the straining of the sensor elements by eliminating tension on the interconnecting waveguide.

For some embodiments, machining the large diameter optical waveguide section forms the mating end 401 with a conical taper to give a high strength transition between the first sensor 400A and the interconnecting fiber portion 402A. The mating end 401 can, for some embodiments, include a length of optical fiber tail spliced to where the large diameter optical waveguide section is machined such that the first sensor 400A with the mating end 401 can be a subassembly manufactured offline and the in-line fiber-to-fiber splicing between the mating end 401 of the first sensor 400A and the interconnecting fiber portion 402A can be performed with improved quickness, ease and accuracy. See, U.S. Publication No. 2004/0165834, entitled "Low-Loss Large-Diameter Pigtail," which is herein incorporated by reference in its entirety. In some embodiments, the first sensor 400A can be metal plated to provide protection from ingress of fluids and gases by, for example, using a vacuum deposition process on the large diameter optical waveguide section. As an example, the first sensor 400A can be metal plated with gold, which has low hydrogen permeability and permittivity.

Figure 3:
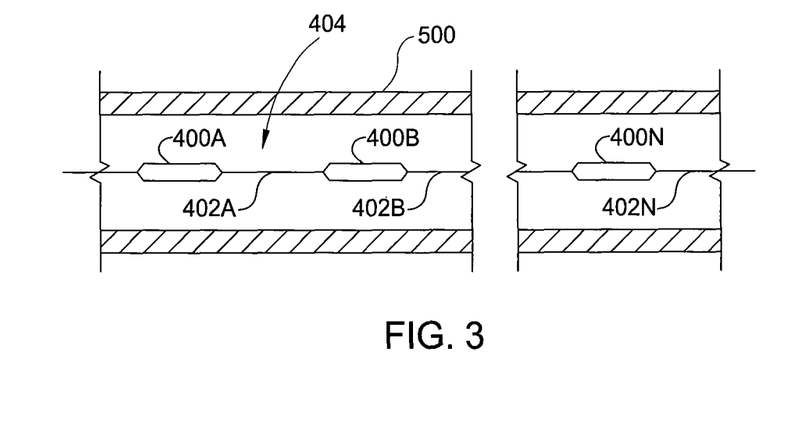
FIG. 3 is a sectional view of the array of temperature sensors disposed in a protective tube.

FIG. 3 illustrates the array 404 of temperature sensors disposed in a protective tube 500. The tube 500 further protects the array 404 from a surrounding environment by inhibiting mechanical disruption, fluid ingress and/or gas ingress. For some embodiments, the tube 500 can be plated to further hinder ingress of gases into an interior where the array 404 of temperature sensors are disposed.

In operation, the array 404 of temperature sensors can be pulled into the tube 500 after several of the sensors 400A-N have been connected together by the interconnecting fiber portions 402A-N. If it is desired to avoid pulling a substantial length of the array 404 of temperature sensors into the tube 500, the tube 500 can be assembled in sections along with the array 404 of temperature sensors. With this concurrent assembly, sections of the tube 500 are successively positioned over one or more corresponding pairs of the sensors 400A-N and the interconnecting fiber portions 402A-N as the length of the array 404 of temperature sensors increases during fabrication.

Figure 4:
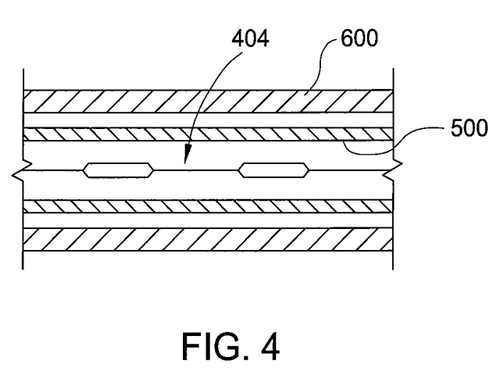
FIG. 4 is a sectional view of the array of temperature sensors disposed in the protective tube and an armor layer surrounding the protective tube.

FIG. 4 shows the array of temperature sensors 404 disposed in the protective tube 500 and an armor layer 600 surrounding the protective tube 500. The armor layer 600 provides additional mechanical protection and can be plated to improve blocking of gases. For some embodiments, the armor layer 600 is plated with about 10.0 microns thickness of tin. The protective tube 500 protects the array of temperature sensors 404 during the process of adding the armor layer 600. For some embodiments, the protective layer includes a further encapsulation layer such as Santoprene™. Additionally, cross section of the armor layer 600 can define a desired form having a square profile, a flat-pack profile or round profile.

Figure 5:
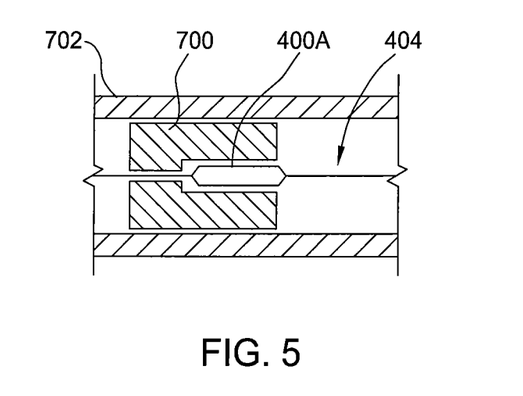
FIG. 5 is a sectional view of a temperature sensor mounted in a fixture within a tube.

FIG. 5 illustrates the first sensor 400A mounted in a fixture 700 within receiving tubing 702. The receiving tubing 702 can be similar to the protective tube 500 shown in FIG. 4 and can also be surrounded by an armor layer. In practice, the fixture 700 can be added to the first sensor 400A as two pieces after assembly of the first sensor 400A into an array 404 of temperature sensors or fed onto the array 404 of temperature sensors during integration of the first sensor 400A into the array 404 of temperature sensors. Regardless of the process for adding the fixture 700 prior to disposing the array 404 of temperature sensors in the tubing 702, the first sensor 400A can be affixed in the fixture 700 by, for example, adhesives or curable polymers. Further, the fixture 700 can also be fixed within the tubing 702 such as with threads, an interference fit or a weld.

Mounting the first sensor 400A within the fixture 700 can therefore fix a location of the first sensor 400A in a radial direction within the tubing 702 and, if desired, longitudinally within the tubing 702. For some embodiments, the fixture 700 can be made of aluminum or Vespel®. Additionally, a material of the fixture 700 and the tubing 702 adjacent the fixture 700 can be thermally conductive to give a direct thermal path between an external environment and the first sensor 400A FIGS. 6A through 6F show successive stages of a procedure for providing a segmented ATS assembly that can, for example, form at least part of the conduit 102 shown in FIG. 1. Accordingly, the same reference characters identify like elements in FIG. 1 and FIGS. 6A through 6F. Segmentation occurs with this procedure due to creation of repeating divisions along the conduit 102 where at least part of the conduit 102 is cut in two at each of the sensors 108A-N, 110A-N, 112A-N as exemplary shown with respect to incorporation of a first sensor 108A in FIGS. 6A through 6F. Because the configuration of each of the sensors 108A-108N, 110A-N, and 112A-N can be substantially the same, only the first sensor 108A is shown and described in detail.

Figure 6A:
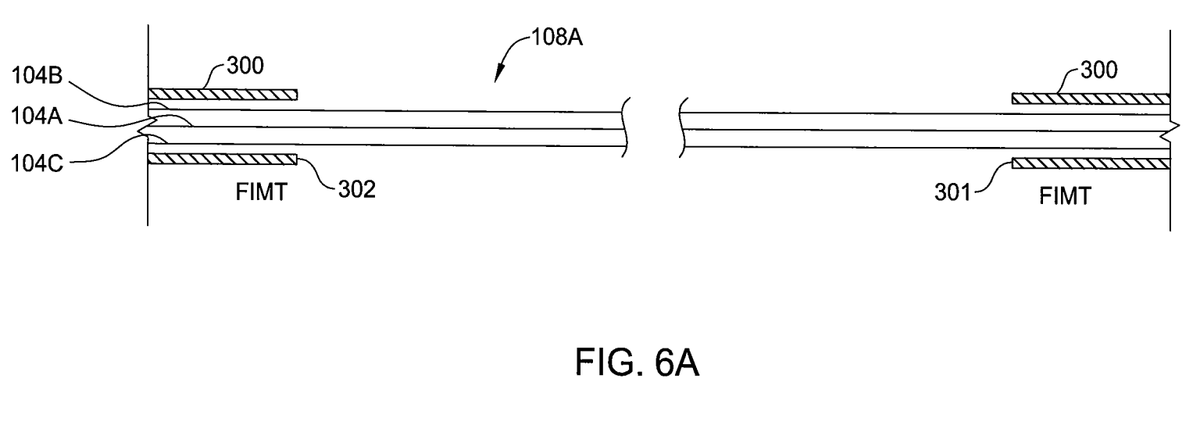
FIGS. 6A through 6F illustrate successive stages of a procedure for providing a segmented ATS assembly that can, for example, form at least part of the conduit shown in FIG. 1 implementing aspects of the invention illustrated in FIGS. 2-5.

FIG. 6A illustrates a detailed cross-section of an initial preparation to integrate the first sensor 108A. Construction of the first sensor 108A begins by providing the waveguides 104A-C in a tube 300 that can be constructed of metal (e.g., a fiber in metal tube, "FIMT") or any material suitable for use in a desired application such as a well-bore application. Cutting out and removing a section of the tube 300 exposes the waveguides 104A-C. The waveguides 104A-C extend from first and second ends 301, 302 of the tube 300 and are cut leaving portions of the waveguides 104A-C exposed at the ends 301, 302.

Figure 6B:
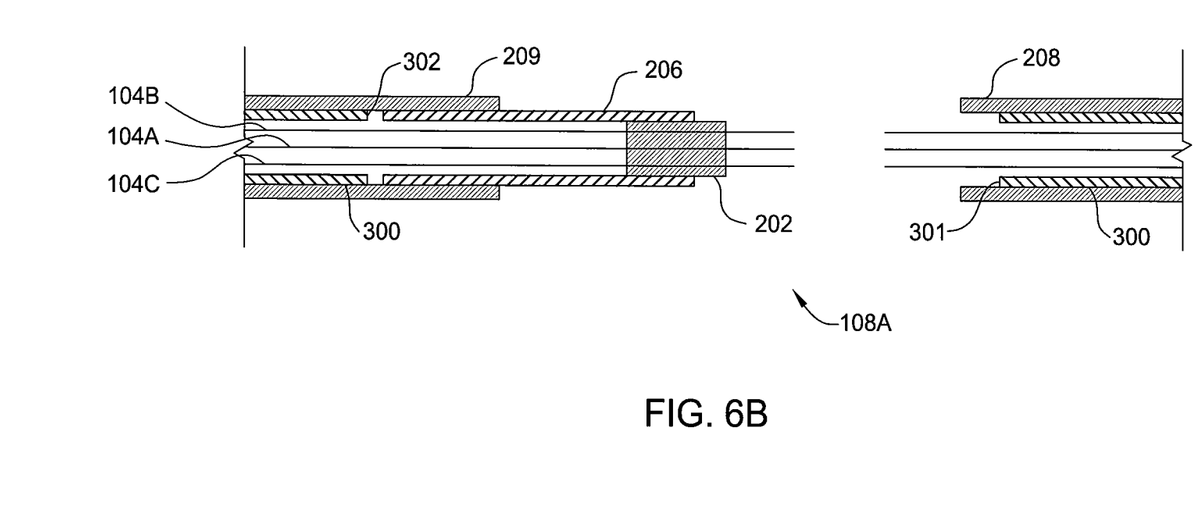

As shown in FIG. 6B, assembly of the first sensor 108A progresses by placing first and second outer tubing 208, 209 respectively over the first and second ends 301, 302 of the tube 300. A tubular insert 206 with a fixture or mount 202 attached inside the tubular insert 206 is placed within the second outer tubing 209; however, the tubular insert 206 can alternatively be placed within the first outer tubing 208. For some embodiments, the tubular insert 206 includes a steel tubular member that is tin plated. The outer tubing 208, 209 has an inner diameter larger than the outer diameter of the tubular insert 206 and the tubing 300. In some embodiments, the outer tubing 208, 209 include steel tubular members that are tin plated. The waveguides 104A-C extend through the mount 202.

Figure 6C:
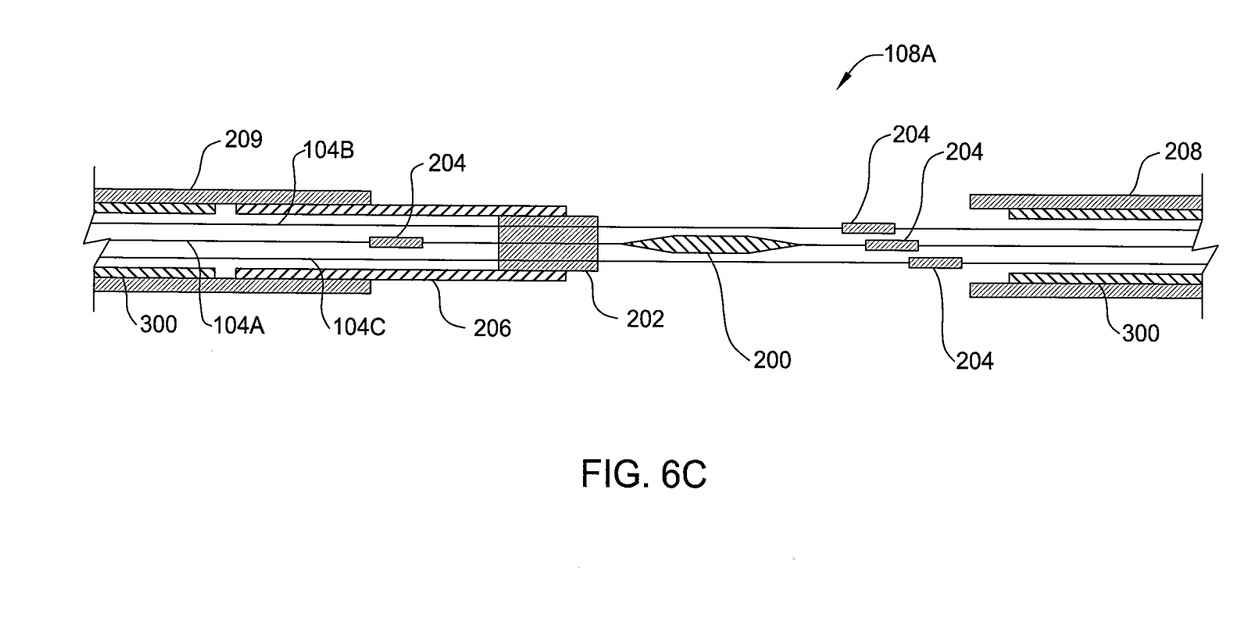

FIG. 6C illustrates the mount 202 in place and the second and third waveguides 104B, 104C spliced back together where previously cut. For some embodiments, the splices 204 are protected by polymide tubes injected with an ultraviolet or a thermally set polymer such as Sylgard 182® thermal cure encapsulant. The splices 204 allow the second and third waveguides 104B, 104C to pass light freely across where the first sensor 108A is located.

Additionally, a large diameter waveguide 200 having a Bragg grating disposed therein is spliced into the first waveguide 104A. The large diameter waveguide 200 can be metal plated for extra protection. For some embodiments, the large diameter waveguide 200 is gold plated but can also be tin plated, carbon coated, or outer surface covered by other suitable low permeability material. As described above with reference to the array 404 of temperature sensors and the first temperature sensor 400A in FIG. 2, this configuration for the large diameter waveguide 200 with the Bragg grating enables the first sensor 108A to be responsive to temperature. The large diameter waveguide 200 is interrogated with light passing through the first sensor 108A and connects the first sensor 108A along the first waveguide 104A, which is relatively smaller in outer diameter than the large diameter waveguide 200.

Figure 6D:
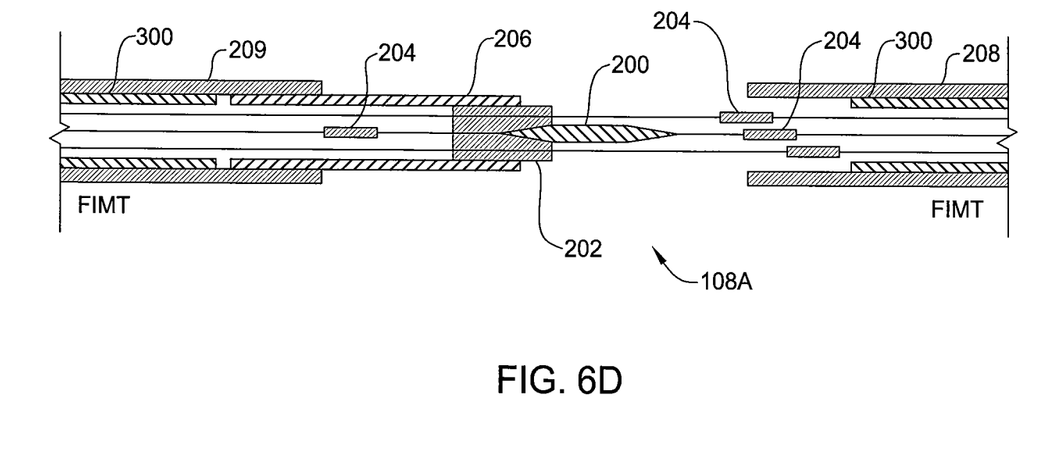

As shown in FIG. 6D, the large diameter waveguide 200 is next inserted into the mount 202. The large diameter waveguide 200 and/or the waveguides 104A-C can then be secured in the mount 202. For example, the mount 202 can be filled with Sylgard 182() silicone encapsulant and then cured thermally such that the mount 202 holds the waveguides 200,104A-C in place.

Figure 6E:
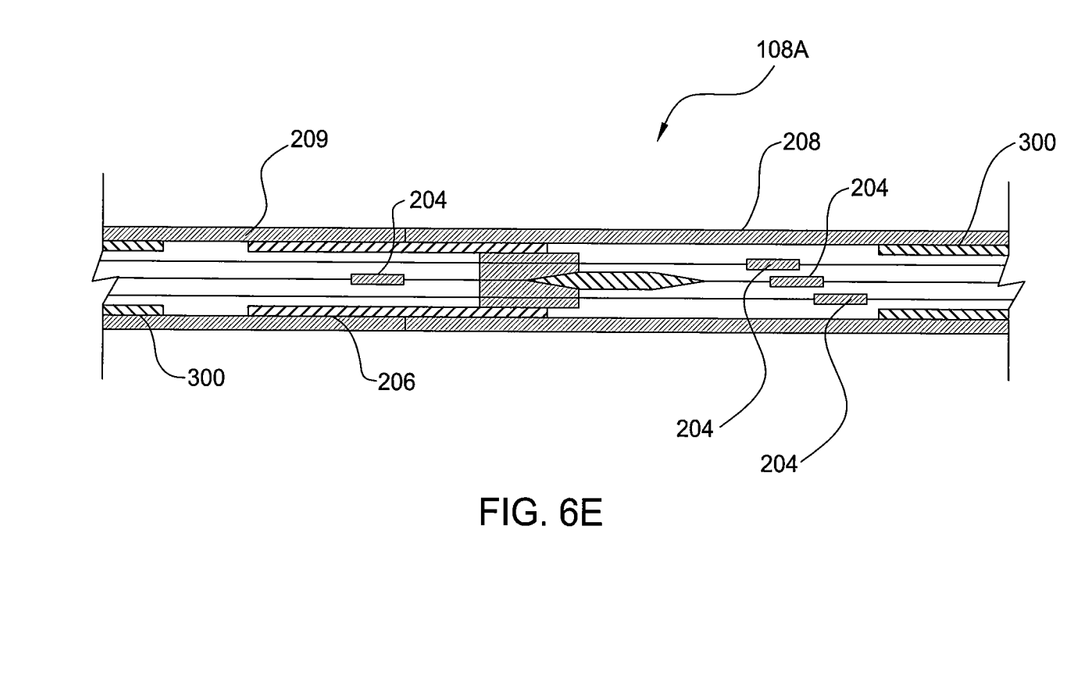

FIG. 6E illustrates the first and second outer tubing 208, 209 slid together over the tubular insert 206 during assembly of the first sensor 108A. As shown, the first and second outer tubing 208, 209 now enclose the waveguides 104A-C along where the section of the tube 300 was removed. With the first and second outer tubing 208, 209 in position, the outer tubing 208, 209 are secured to the tube 300 and one another and/or the tubular insert 206. For some embodiments, this securing occurs by crimping the outer tubing 208, 209 to one or both the tubular insert 206 and the tube 300. Additionally, orbital welds, laser welds or solder joints can secure and/or seal an interior area enclosed at the first sensor 108A.

Figure 6F:
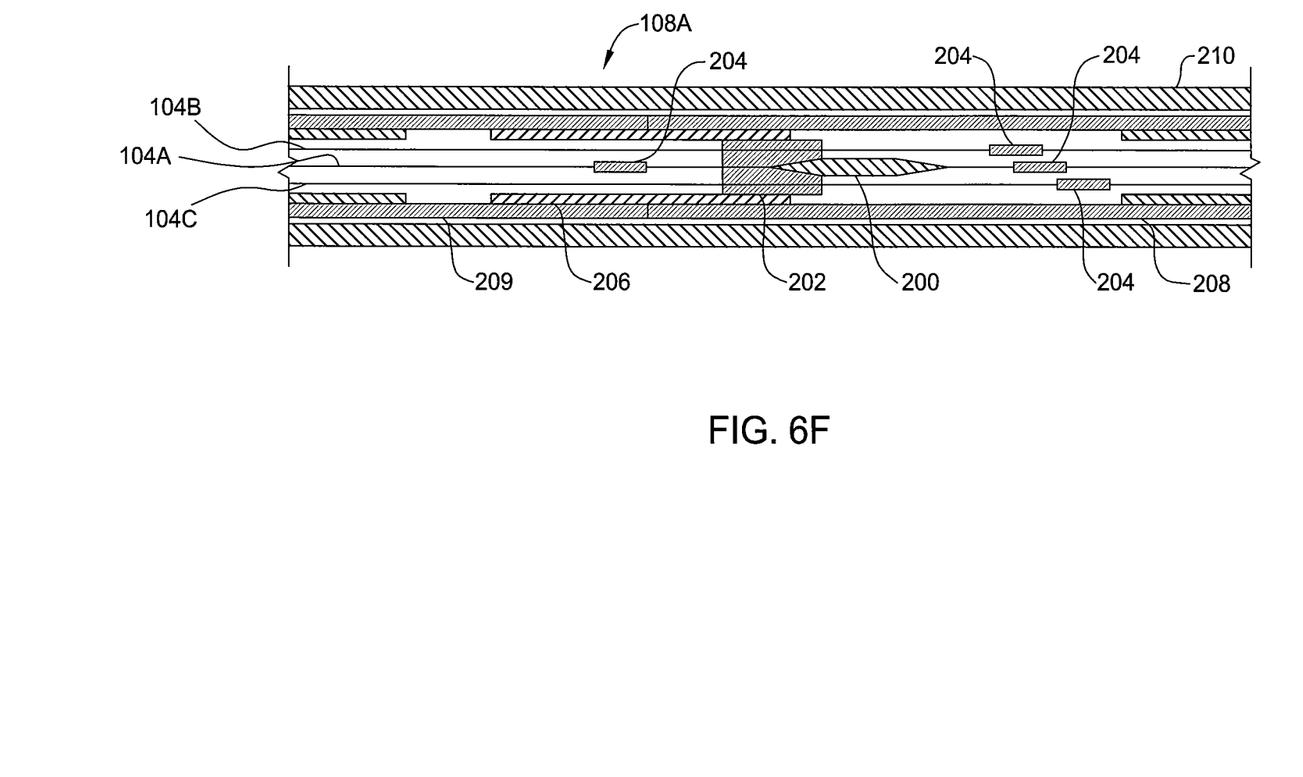

FIG. 6F shows the first sensor 108A upon completion of assembly. An armoring 210 is placed around the first and second outer tubing 208, 209 at the first sensor 108A. The armoring 210 provides corrosion resistance and mechanical protection to the outer tubing 208, 209. Between each of the sensors 108A-N, 110A-N and 112A-N, the waveguides 104A-C can be surrounded by the tube 300 and/or the armoring 210, or any other material for protecting the waveguides 104A-C.

Figure 7:
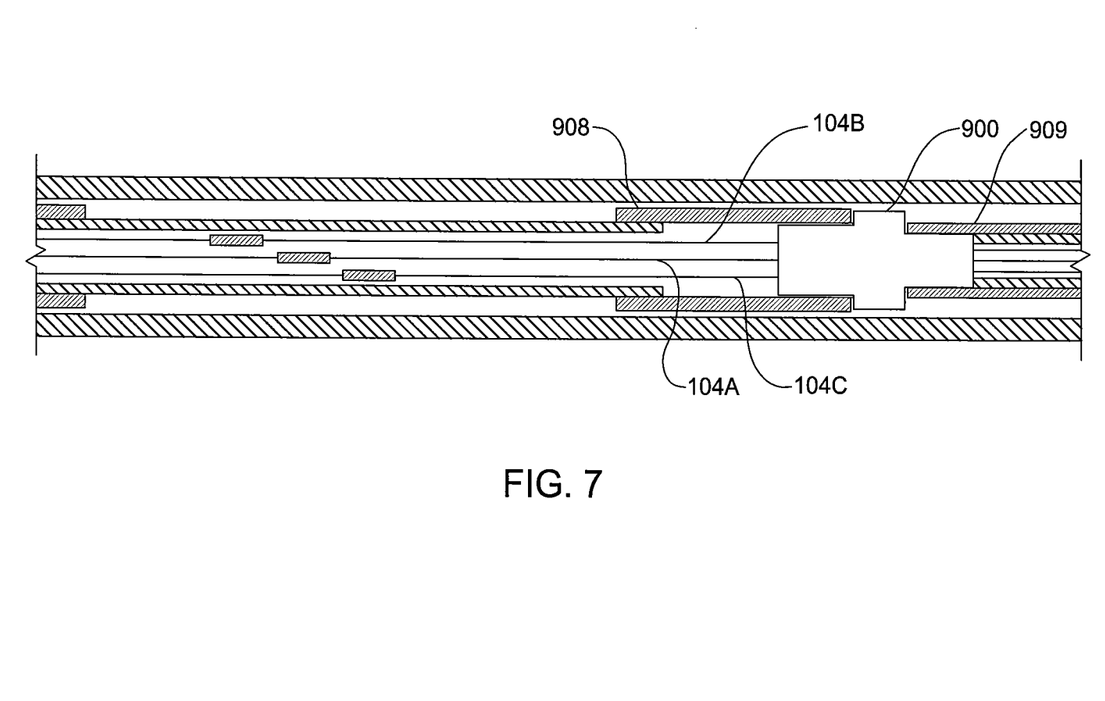
FIG. 7 is a sectional view of a feed-through for disposal along an ATS assembly.

FIG. 9 illustrates a feed-through 900 that can be disposed along the conduit 102 (shown in FIG. 1) to block fluids and gasses that potentially propagate along a first inner tubing 909, which can be a length of FIMT used to reach the sensors 108A-N, 110A-N and 112A-N or provide the interconnection between the sensors 108A-N, 110A-N and 112A-N. The waveguides 104A-C can be soldered into the feed-through 900, which can be welded or soldered into the first inner tubing 909. The feed-through 900 is adapted to connect to a second inner tubing 908 on one end and the first inner tubing 909 on the other end. The feed-through 900 can be arranged to reduce or enlarge the diameter of the second inner tubing 908 relative to the first inner tubing 909 to alter an outer diameter of the conduit 102 as required for specific applications. For some embodiments, the feed-through 900 is gold plated Kovar™.

Referring back to FIG. 1, lowering the conduit 102 into the well-bore 100 positions all the sensors 108A-N, 110A-N, 112A-N incorporated into the conduit 102 at desired locations. The use of multiple waveguides, having multiple arrays allows for the monitoring of a large area of the well-bore, while only having to run one conduit into the well-bore. Once the conduit 102 is in place a light source 114 generates a light pulse that is sent down the waveguides 104A-C. Each pulse of light travels down its respective waveguide 104A-C. The light is used to interrogate each of the sensors 108A-N, 110A-N, 112A-N in each array 106A-C. Light reflected back to a processor 116 is interrogated to analyze the reflected light and determine conditions at multiple locations in the well-bore where each of the sensors 108A-N, 110A-N, 112A-N are disposed.

Embodiments described above relate to improved array temperature sensing (ATS) systems that are cane based. Benefits provided by these embodiments include extended operating range (e.g., systems 60.0 kilometers (km) in length) due to reduction in signal attenuation from reflections at each discrete cane based sensor element within the array along an optical fiber length. Interrogation of the cane based sensor elements within the ATS systems according to embodiments of the invention enable fast ("real time") update rates of, for example, about 1.0 hertz and temperature resolution of 0.01° C., for example. As one comparison, a Raman Distributed Temperature Sensing (DTS) typically offers a maximum operating range of only 15.0 km and achieves slower update rates of about 0.01 Hz and less temperature resolution at 0.1° C.

Furthermore, embodiments of the invention are substantially immune to errors resulting from changes in differential loss between the Raman Stokes and anti-Stokes bands which can occur over time due to hydrogen ingress or changes in connector losses. These changes can be detrimental to Raman DTS unlike aforementioned embodiments of the invention. Still further, the cane based sensor elements within the ATS systems according to embodiments of the invention can be accurately located such that temperature at a desired discrete point is measured. By an exemplary contrast, fiber overstuff and installation procedures may prevent accurate determination of event locations along a DTS cable since there is not necessarily a direct relation to location along the cable and position on a DTS fiber within the DTS cable.

In addition, the cane based sensor elements within the ATS systems according to embodiments of the invention can be simply packaged to isolate the cane based sensor elements from strain. In other words, the cane based sensor elements can eliminate strains applied to Bragg gratings within the cane based sensor elements or at least prevent strains sufficient to induce a detectable response change in the Bragg gratings from being imparted thereto.

As previously described, embodiments of the invention include the cane based sensor elements that are plated with metals for protection from gas and/or liquid ingress. By contrast with completely fiber based sensors and sensing systems that cannot effectively be plated without creating additional complications, this plating of the cane based sensor elements does not introduce hysteresis problems and presents substantially no settling. With respect to settling, plating the cane based sensor elements does not alter, or at least substantially does not alter, characteristics of the Bragg gratings disposed therein after a coating process unlike more delicate fibers with less bulk that can be overwhelmed by even a minimally thick plating and its coating process. Regarding hysterisis, the cane based sensor elements even with the metal plating provide consistent repeatable responses through temperature cycles such as from 0.0° C. to 200.0° C. while completely fiber based sensors and sensing systems that have been metal plated can begin to act more like the metal coating due to stored energy absorbed by the metal coating dominating the fiber response and detrimentally producing non-linear changes of such configurations in response to temperature.

While the foregoing is directed to embodiments of the present invention, other and further embodiments of the invention may be devised without departing from the basic scope thereof, and the scope thereof is determined by the claims that follow.

What is claimed is:

1. An apparatus for monitoring a condition in a well-bore, comprising:
   first and second sensors spaced along a length of an optical waveguide, wherein the first and second sensors are formed respectively within first and second enlarged outer diameter portions of the waveguide relative to an interconnecting portion of the waveguide between the sensors; and
   a conduit surrounding the waveguide and spanning the length of the waveguide.

2. The apparatus of claim 1, wherein the sensors are responsive to temperature to enable measuring temperature at each of the first and second sensors.

3. The apparatus of claim 2, further comprising signal interface equipment coupled to the conduit positioned in the borehole, wherein the signal interface equipment is configured to receive responses from the optical sensors and determine temperatures along the borehole.

4. The apparatus of claim 1, further comprising a plurality of sensors spaced along a separate optical line from the waveguide, wherein the separate optical line is disposed within the conduit.

5. The apparatus of claim 1, further comprising a plurality of sensors spaced along a separate optical line from the waveguide, wherein the plurality of sensors spans a different location than the first and second sensors.

6. The apparatus of claim 1, wherein the first and second enlarged outer diameter portions have respectively first and second reflective gratings disposed therein.

7. The apparatus of claim 1, wherein the first sensor includes a first mount that the first enlarged outer diameter portion is fixed in and the second sensor includes a second mount that the second enlarged outer diameter portion is fixed in.

8. The apparatus of claim 7, wherein the mounts are thermally conductive.

9. The apparatus of claim 7, wherein the mounts are secured to the conduit.

10. The apparatus of claim 1, wherein the conduit comprises a metal plated tube.

11. The apparatus of claim 1, wherein the conduit comprises a tin plated tube.

12. The apparatus of claim 1, wherein an interior of the conduit is sealed from an external surrounding environment to protect the waveguide from ingress of fluid and gas.

13. The apparatus of claim 1, wherein the conduit comprises an inner tube and an armor layer.

14. The apparatus of claim 1, wherein the first and second enlarged outer diameter portions of the waveguide are metal plated.

15. An apparatus for monitoring a condition in a well-bore, comprising:
- a plurality of Bragg grating optical sensors disposed along a length of an optical waveguide, wherein the sensors are connected to one another by fiber portions of the waveguide having an outer diameter that is smaller than an outer diameter of the sensors;
- a protective tubing surrounding the length of the waveguide; and
- an armor layer surrounding the protective tubing.

16. The apparatus of claim 15, wherein at least one of the protective tubing and the armor layer are metal plated tube.

17. A method of surveying temperature in a borehole, comprising:
- deploying a conduit surrounding a length of an optical waveguide defining a plurality of optical sensors disposed along the length into the borehole, wherein the sensors are connected to one another by portions of the waveguide having an outer diameter that is smaller than an outer diameter of the sensors; and
- determining temperatures along the borehole based on responses from the optical sensors.

* * * * *

UNITED STATES PATENT AND TRADEMARK OFFICE
CERTIFICATE OF CORRECTION

PATENT NO. : 8,737,774 B2
APPLICATION NO. : 11/468646
DATED : May 27, 2014
INVENTOR(S) : MacDougall et al.

Page 1 of 1

It is certified that error appears in the above-identified patent and that said Letters Patent is hereby corrected as shown below:

Title Page, Item (56) References Cited:

Column 1, line 2, under U.S. Patent Documents

Please delete "6,304,666 B1 10/2001 Yamate et al.".

Signed and Sealed this
Twelfth Day of August, 2014

Michelle K. Lee
*Deputy Director of the United States Patent and Trademark Office*